United States Patent [19]

Blanchard et al.

[11] Patent Number: 5,612,978
[45] Date of Patent: Mar. 18, 1997

[54] METHOD AND APPARATUS FOR REAL-TIME ADAPTIVE INTERFERENCE CANCELLATION IN DYNAMIC ENVIRONMENTS

[75] Inventors: Scott D. Blanchard; Joseph O. Lester, both of Mesa, Ariz.

[73] Assignee: Motorola, Inc., Schaumburg, Ill.

[21] Appl. No.: 453,420

[22] Filed: May 30, 1995

[51] Int. Cl.$^6$ .................................................. H04B 1/10
[52] U.S. Cl. .................... 375/350; 375/346; 364/724.01; 348/607; 455/307
[58] Field of Search .......................... 375/346, 350, 375/202, 351; 455/296, 307, 306; 364/724.18, 724.01; 348/607, 403; 382/248

[56] References Cited

U.S. PATENT DOCUMENTS

| | | | |
|---|---|---|---|
| 4,613,978 | 9/1986 | Kurth et al. | 375/346 |
| 4,658,426 | 4/1987 | Chabries et al. | 381/94 |
| 5,325,204 | 6/1994 | Scarpa | 375/350 |
| 5,383,225 | 1/1995 | Aguirre et al. | 375/106 |
| 5,410,750 | 4/1995 | Cartwell et al. | 455/307 |
| 5,422,912 | 6/1995 | Asser et al. | 375/350 |

OTHER PUBLICATIONS

"Digital Signal Processing", by Alan V. Oppenheim and Ronald W. Schafer, Prentice-Hall, Inc., Englewood Cliffs, New Jersey, pp. 110–117.

"A Time Varying Transform Domain Filter for Interference Rejection in Direct–Sequence Spread–Spectrum", by Dan B. Ruth and Mark A. Wickert, 1992 IEEE, Publication 0–7803–0585–X/92, pp. 0908–0912.

"Narrowband Interference Rejection Using Small FFT Block Sizes", by Steven J. Howard, 1992 IEEE, Publication 0–7803–0585–X/92, pp. 0608–0611.

"Non–linear Filtering Techniques for Narrow–Band Interference Rejection in Direct Sequence Spread–Spectrum Systems", by T. Kasparis, M. Georgiopoulos and E. Payne, 1991 IEEE, Publication CH2981–9/91/0000–0360, pp. 0360–0363.

"Narrow–Band Interference Rejection Using Real–time FT" Davidovici et al. IEEE 1989 pp. 713–722.

"Adaptive Narrow–Band Interference Rejection in a DSSS Intercept Receiver Using TDS Processing Tech." IEEE 1989 pp. 7359–7366 Gevargiz et al.

Primary Examiner—Stephen Chin
Assistant Examiner—T. Ghebretinsae
Attorney, Agent, or Firm—Gregory J. Gorrie

[57] ABSTRACT

A finite impulse response filter performs an FFT on a signal, multiplies it by a transfer function in the frequency domain, and then performs an inverse FFT. The transfer function is dynamically computed in real-time by detecting signal energy in the frequency domain and turning off bins that contain the signal. The signal is delayed prior to turning off the bin in a FIFO memory by an amount equal to the time required to compute the transfer function. In this way, relatively fast changes in the interference environment can be tracked and rejected. For example, short duration narrow band interference signals in the presence of a wideband signal of interest, including direct sequence (DS) spread-spectrum signals in the presence of frequency hopped (FH) spread spectrum signals are rejected. The received signal quality of DS spread spectrum signals is improved.

20 Claims, 2 Drawing Sheets

METHOD AND APPARATUS FOR REAL-TIME ADAPTIVE INTERFERENCE CANCELLATION IN DYNAMIC ENVIRONMENTS

FIELD OF THE INVENTION

This invention relates in general to the field of radio frequency circuits, in particular to receivers that reject undesired signals and more particularly to frequency domain filters and digital signal processing.

BACKGROUND OF THE INVENTION

The use of filters to reject undesired signals and pass a signal of interest is a basic building block for signal processing applications. Filters are generally classified as either fixed or adaptive. If an undesired signal is present having a known frequency and bandwidth, and if the center frequency of the undesired signal is in the same frequency band as the signal of interest, the undesired signal may be rejected using a fixed notch filter. Fixed notch filters have a constant (non-time varying) center frequency and bandwidth. In general, if the bandwidth of the notch filter is small compared to the bandwidth of the signal of interest, the notch filter does not significantly distort the signal of interest.

However, if either the frequency or bandwidth of the signal of interest is not known a-priori, then an adaptive filter may be employed to dynamically change its center frequency and bandwidth as a function of the interference environment. Adaptive filters generally require a reference signal that is used to compute their frequency response. The reference signal may be a training signal transmitted over a channel. Alternatively, a receiver may generate its own reference signal, for example using bit detections in a decision feedback equalizer. Both of these types of adaptive filters have difficulty rejecting unwanted signals that change rapidly in time or frequency. Typically, classical adaptive filters can only track very slow time varying signals because many samples of the interference environment are necessary in order to converge to a desired frequency response. For example, when training sequences are used, an adaptive filter updates its response whenever a new training sequence is received resulting in slow response times.

Adaptive filters which generate their own reference signal are continuously adapting but long averages of the interference environment are necessary in order to converge to a desired frequency response. Another problem with these types of adaptive filters is that if the interference environment is too bad or changes too rapidly, they are no longer able to generate a valid reference signal and do not converge on the desired frequency response.

Thus, what is needed are a method and apparatus for adaptively canceling unwanted signals in a dynamic interference environment. What is also needed are a method and apparatus that can track relatively fast changes in an interference environment. What is also needed are a method and apparatus that rejects short duration narrow band interference signals in the presence of a wideband signal of interest. What is also needed are a digital filter apparatus that cancels undesired signals that vary rapidly in time.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides a method and apparatus for adaptively canceling unwanted signals in a dynamic interference environment. The present invention also provides a method and apparatus that can track relatively fast changes in an interference environment. The present invention also provides a method and apparatus that rejects short duration narrow band interference signals in the presence of a wideband signal of interest. The present invention also provides a digital filter apparatus that cancels undesired signals that vary rapidly in time.

Unlike classical adaptive filters, one of the inputs to the present invention's adaptation process is a measurement of the time duration of the interference signal. The present invention is particularly suited to rejecting short duration narrow band interference signals in the presence of a wideband signal of interest. For example, the present invention can adaptively notch a frequency hopped (FH) spread spectrum signal improving the received signal quality of a direct sequence (DS) spread spectrum signal sharing the same frequency spectrum. The present invention rejects short duration signals in real-time on a burst by burst basis.

Figure 1:
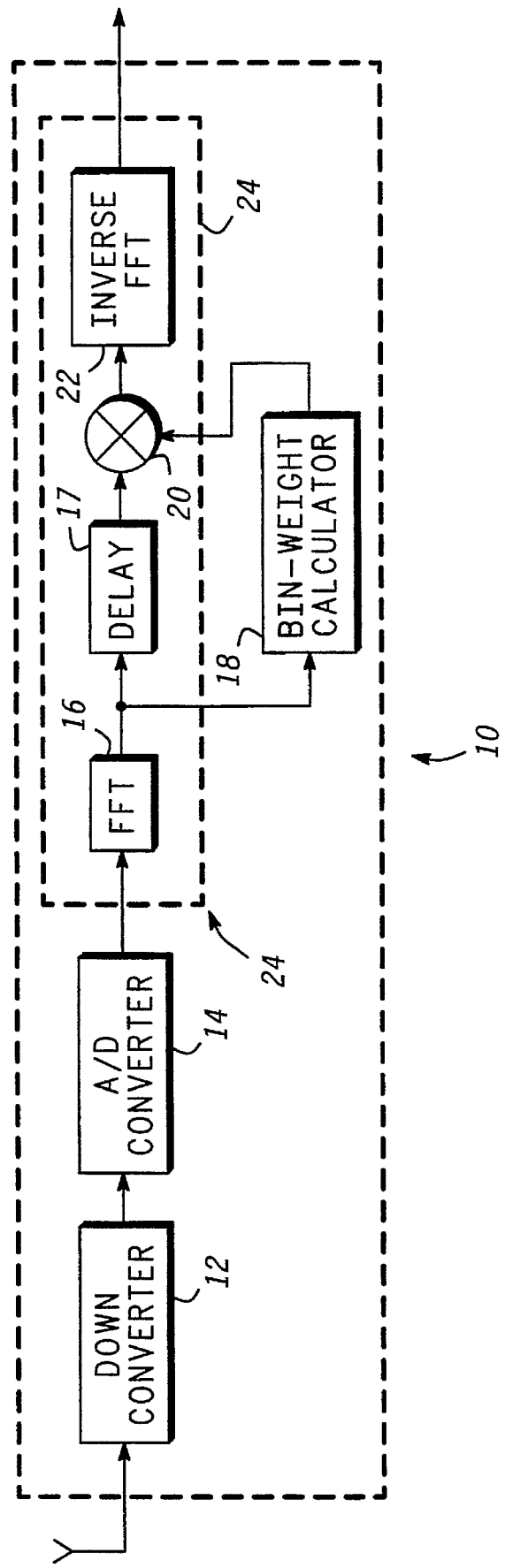
FIG. 1 is a simplified block diagram of a receiver in accordance with a preferred embodiment of the present invention.

FIG. 1 is a simplified block diagram of receiver 10 in accordance with a preferred embodiment of the present invention. Receiver 10 includes downconverter 12 for downconverting received signals over a wide bandwidth and producing either complex or real baseband signals. Analog to digital (A/D) converter 14 digitizes the baseband signals from downconverter 12.

The digitized signals from A/D converter 14 are supplied to filter 24. Filter 24 is mathematically equivalent to a finite impulse response (FIR) filter by performing a Fast Fourier transform (FFT), multiplying by a transfer function in the frequency domain, and then performing an Inverse FFT (IFFT). The transfer function is dynamically computed by detecting signal energy in the frequency domain and turning off bins that contain the signal. The signal is delayed prior to turning off the bin in a first-in first-out (FIFO) memory device by an amount equal to the time required to compute the transfer function. Chip sets are commercially available that perform a 4K point FFT in real time on bandwidths up to 20 MHz. Using one of these chip sets, the equivalent of a 2K FIR filter can be performed over a wide bandwidth. Filter 24 includes FFT element 16, delay element 17, multiplier 20 and IFFT element 22 which are discussed below.

In FFT element 16, an FFT is performed on the digitized signals from A/D converter 14. In other words, the digitized signals are converted from the time domain to the frequency domain. Through buffering and weighting processes well known in the art, a plurality of frequency bins result where each bin corresponds to a certain frequency. In the preferred embodiment, the weighting function has the property that when added to itself delayed by integer multiples of the overlap amount, a constant value results.

Delay element 17 time delays the frequency bins a predetermined amount before sending them to multiplier 20. The predetermined delay of delay element 17 is preferably a time associated with the sampling of blocks of bins processed together in bin weight calculator 18, in addition to the processing time required by bin weight calculator 18 to process those blocks of bins.

Bin weight calculator 18 receives blocks of the frequency bins from FFT element 16 and determines when an undesired signal is present. In addition, bin weight calculator 18 determines which frequency bin (or bins) contains the undesired signal. In general, bin weight calculator 18 uses changes in the bin amplitude with time and changes in the bin amplitude with frequency to determine which bins contain an undesired signal. Frequency bins that are determined to contain an undesired interference signal are notched while those that do not contain undesired signals are not notched. Preferably, bin weight calculator 18 produces a "zero" value when a frequency bin is to be notched and a "one" when a frequency bin is to be passed. The procedure to find and cancel undesired interference signals is discussed in more detail below.

In the preferred embodiment, bin weight calculator 18 includes at least one processor, and preferably several processors, memory devices and other elements those of skill in the art understand that are associated with performing as a minimum the functions described herein.

Multiplier 20 multiplies the delayed frequency bins received from delay element 17 with either the "one" or "zero" received from bin weight calculator 18. As a result of the multiplication process performed by multiplier 20, frequency bins received from delay element 17 are passed that are multiplied with a "one" from bin weight calculator 18. On the other hand, frequency bins received from delay element 17 are notched that are multiplied with a "zero" from bin weight calculator 18.

IFFT element 22 performs an IFFT on the frequency bins that have not been notched, thereby converting them to time samples. In other words, the frequency bins are converted from the frequency domain to the time domain. The time samples are then recombined. Those of skill in the art will understand that IFFT element 22 also performs buffering and addition functions, among other things, to implement a frequency domain overlap-and-add filter well known in the art. After the time samples are recombined, the output is the desired digitized wideband signal with the undesirable interference signal notched out.

As can be seen by the above description, FFT element 16, delay element 17, multiplier 20 and IFFT element 22, in combination can be viewed functionally as an overlap and add frequency domain filter 24. The input to multiplier 20 from bin weight calculator 18 determines the specific frequency bin to notch.

In general, the operation of A/D converter 14, FFT element 16, and IFFT element 22 is described as follows. A/D converter 14 samples and processes the input signals. The input signals are grouped into blocks of "N" samples each, where each set of "N" blocks overlaps the previous set by an amount "q" For example, if the blocks overlap by 75%, then "q" equals 0.75. Those of ordinary skill in the art understand that overlapping helps prevent aliasing of the signal being filtered. Each of the "N" samples is weighed with a weighting function herein referred to as a window. The weighting function reduces the amount of co-channel interference between adjacent bins in the frequency domain.

When overlap of the blocks of "N" samples is used in addition to the weighting of the samples, an amplitude modulation may be induced which distorts the signal of interest if the overlap and discard method of recombining the time samples is used, or the sum of the window function with a delayed version of itself doesn't add to a constant. On the other hand, if the overlap and add method (performed in IFFT element 22) of recombining samples is used and the window function has the property that when it is added to a delayed version of itself repetitively by multiples of the selected overlap, a constant results, then no self induced amplitude modulation occurs. Self induced amplitude modulation caused by improper recombination of samples and a poor weighting function can be significant.

Figure 2:
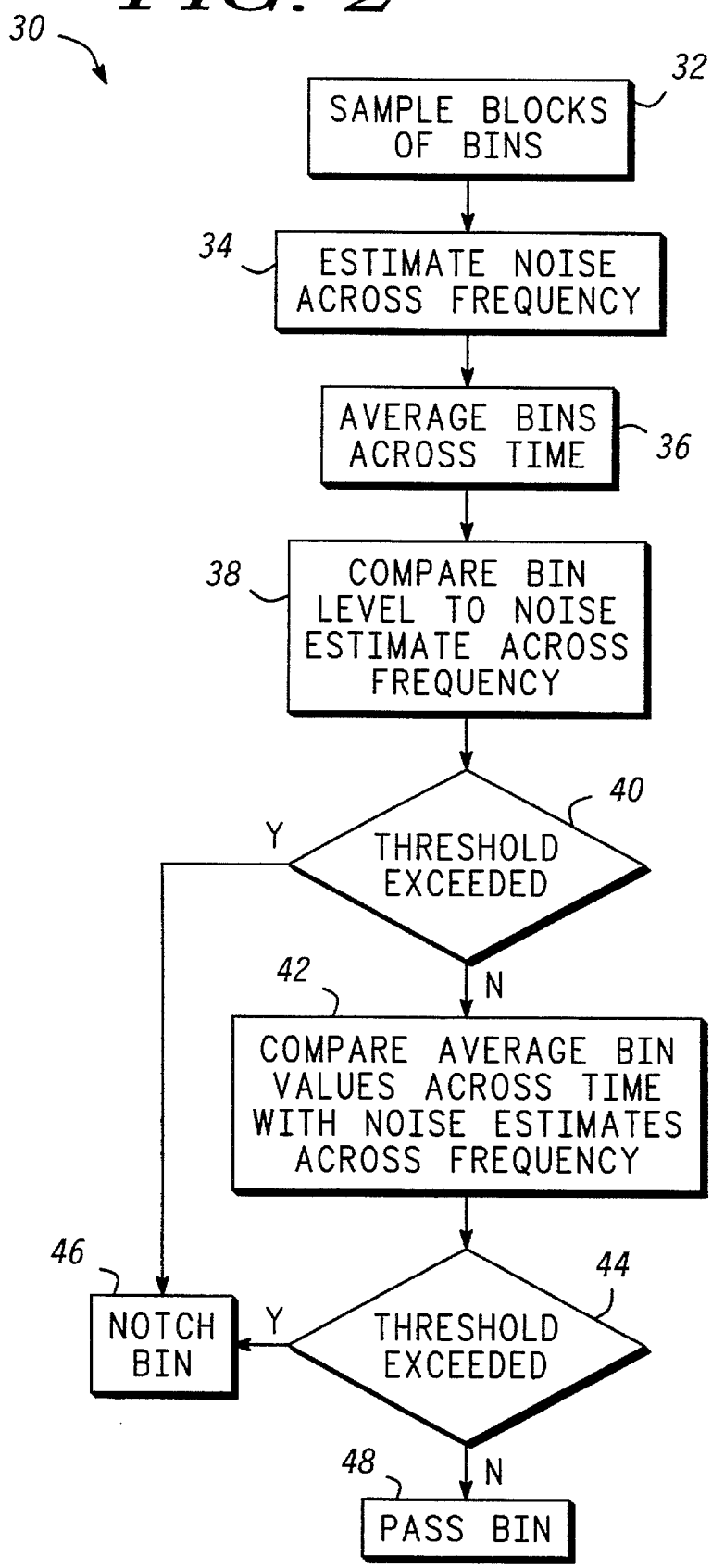
FIG. 2 is a simplified flow chart of an adaptive signal cancellation procedure in accordance with a preferred embodiment of the present invention.

FIG. 2 is a simplified flow chart of adaptive signal cancellation procedure 30 in accordance with a preferred embodiment of the present invention. Procedure 30 is preferably performed by bin weight calculator 18 (FIG. 1). In task 32, blocks of frequency bins are sampled, each block being a spectrum of the received signal at a different time. Each bin corresponds to a different frequency. The resolution of each frequency bin depends on several items discussed below.

In task 34, a noise estimate is performed across each block of frequency bins sampled in task 32. Preferably, the noise estimate is obtained for each FFT frequency bin in the block based on averaging the noise of frequency bins. Task 34 performs a noise estimate for each block of frequency bins sampled in task 32. Task 34 results in a plurality of noise estimates, each noise estimate for a different block of bins. Since each block corresponds with a different time, each noise estimate corresponds with a different time sample. Preferably, the bandwidth of the interference signal is small compared to the bandwidth of the noise estimator so that the interference signal has little effect on the noise estimate.

Task 36 performs an average of frequency bins across blocks for a specific frequency bin. In other words, an average is calculated across time for all blocks. Preferably, the average is calculated for all blocks retrieved in task 32 and the duration represented by these blocks corresponds to a time duration of length TL. Task 36 results in a plurality of bin averages, each average corresponding to a different frequency (or bin).

In task 38, an individual bin level is compared to the noise estimate across frequency (i.e., the noise average corresponding to that bin as computed in task 34). Preferably, for each bin retrieved in task 32, a ratio of the individual bin level to the noise estimate across frequency (determined in task 34) is computed. Task 40 determines when this ratio exceeds a predetermined threshold. If the ratio is exceeded, the bin is notched in task 46, preferably for a duration of Ts. Ts corresponds to the minimum expected duration of an interfering signal. When the ratio is not exceeded, task 42 is executed. In other words, tasks 38 and 40 look for interference signals having a duration less than a predetermined short duration $T_S$, where $T_S$ is an input to the procedure.

In the preferred embodiment, task 40 implements the Ts duration using a M of N filter. This filter requires that M of the last N ratios calculated exceed the predetermined threshold. When this is true, then the bin is notched. M is determined based on the desired Ts duration. This filter adds robustness to the implementation by eliminating notching of frequency bins based on sporadic signal noise.

Task 42 compares the average bin value across time calculated in task 36 with the noise estimates across frequency from task 34. Preferably, a ratio of the average bin value across time to the noise estimates across frequency is calculated. Task 44 determines when the ratio exceeds a predetermined threshold. When the ratio is exceeded, the bins are notched in task 46 for a duration of TL which corresponds to a duration of the number of blocks used in computing the average in task 36. When the ratio is not exceeded, the bins are not notched (task 48). In other words, tasks 42 and 40 look for long duration narrowband signals that are longer than a predetermined long duration $T_L$, where $T_L$ is an input to the procedure. TL is preferably the time duration associated with a block of bins sampled in task 32.

In the preferred embodiment, task 44 implements the TL duration using a K of L filter. This filter requires that K of the last L ratios calculated exceed the predetermined threshold. When this is true, then the bin is notched. K is determined based on the desired TL duration. This filter adds robustness to the implementation by eliminating notching of frequency bins based on sporadic signal noise.

In the preferred embodiment, when task 46 notches a frequency bin, bin weight calculator 18 (FIG. 1) outputs a "zero" to multiplier 20 (FIG. 1). When task 48 passes a frequency bin, bin weight calculator 18 provides a "one" to multiplier 20. As a result, the corresponding bin is either passed or notched by multiplier 20.

In the preferred embodiment, tasks 34 and 36 are performed simultaneously. However nothing requires either task to being performed in any particular order. For example, task 36 may be performed prior to task 34. The same applies to tasks 38 and 42, and to tasks 40 and 44. For example, in the preferred embodiments, tasks 38 and 42 are also performed simultaneously, and tasks 40 and 44 are performed simultaneously. As a result, when either task 40 or task 44 determines that their respective thresholds have been exceeded, the bin in notched.

As discussed above, when the delay associated with delay element 17 is set to be equal to the processing time of procedure 30, the frequency bin coming out of delay element 17 corresponds to the frequency bin determined to be notched or passed in procedure 30. In this way, an undesired signal appearing at a certain frequency can be quickly rejected. The minimum delay, assuming no other processing time, is equal to the number of blocks averaged in task 36, or TL. By performing at least tasks 34 and 36 simultaneously, the processing delay is constant for all input signals, and delay element 17 (FIG. 1) is implemented with a constant delay function.

Thus, a method and apparatus for adaptively canceling unwanted signals in a dynamic interference environment has been described. One advantage is that it can track relatively fast changes in an interference environment. Another advantage is that it rejects short duration narrow band interference signals in the presence of a wideband signal of interest. Another advantage is that the digital filter apparatus cancels undesired signals that vary rapidly in time. The improvements over known technology are significant.

The present invention is easily adaptable to other filtering needs, such as noise whitening for narrowband detection enhancements, or time gates to either reject short duration signals and pass narrow bandwidth long duration signals, or reject narrow bandwidth long duration signals and pass short duration signals. Noise whitening refers to the process of making non-Gaussian noise look like white noise. It is accomplished by the detection of narrowband interferers in the frequency domain and setting the frequency bins equal to the noise level.

The present invention also provides a method and apparatus that can dynamically track and pass signals based on their time duration, thus providing a discrimination parameter to either pass or reject undesired signals in signal collection applications. For example, the adaptive filter and method may be employed in many receiver applications, radios, modems, etc.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. An adaptive frequency domain filter adapted for responding to a non-continuous wave short duration interference signal comprising:

a fast Fourier transform (FFT) element for transforming digitized baseband signals from a time domain to a frequency domain and providing a plurality of frequency bins, each frequency bin corresponding to a frequency range;

a delay element for delaying said frequency bins by a predetermined amount and providing delayed frequency bins;

a multiplier for either passing or notching each of said delayed frequency bins;

an inverse FFT element for transforming said delayed frequency bins provided by said multiplier from said frequency domain to said time domain; and a bin weight calculator adapted for sampling said plurality of frequency bins provided by said FFT element and providing a control signal that directs said multiplier to notch one of said delayed frequency bins, said control signal being time coincident with each of said delayed frequency bins provided by said delay element.

2. A filter as claimed in claim 1 wherein said bin weight calculator includes:

a noise estimator adapted for estimating noise levels across frequency for each of a plurality of blocks of said frequency bins, each block of said frequency bins being delayed in time from a previous block and corresponding to a time sample;

a processor for comparing an individual bin level to said noise level for each block of frequency bins; and an output for providing said control signal to notch one of said frequency bins when said individual bin level exceeds said noise level by a predetermined threshold, and wherein said control signal causes said multiplier to notch at least one delayed frequency bin having said short duration interference signal present therein, and wherein said predetermined amount of delay is at least a time required for said noise estimator to estimate said noise level, for said processor to compare said individual bin level to said noise level and for said output to provide said control signal.

3. An adaptive frequency domain filter adapted for responding to interference signals comprising:

a fast Fourier transform (FFT) element for transforming digitized baseband signals from a time domain to a frequency domain and providing a plurality of frequency bins, each frequency bin corresponding to a specific frequency;

a delay element for delaying said frequency bins by a predetermined amount and providing delayed frequency bins;

a multiplier for either passing or notching each of said delayed frequency bins;

an inverse FFT element for transforming said delayed frequency bins provided by said multiplier from said frequency domain to said time domain; and a bin weight calculator for providing a control signal that directs said multiplier to either notch or pass each of said frequency bins, said control signal being time coincident with each of said delayed frequency bins provided by said delay element, said bin weight calculator including:

a noise estimator for estimating a noise level across frequency for each block of a plurality of blocks of said frequency bins;

a processor for comparing an individual bin level to said noise level; and an output for providing said control signal to notch one of said frequency bins when said individual bin level exceeds said noise level by a short duration signal predetermined threshold, and wherein the processor includes means for comparing said individual bin level to said noise level to detect an interference signal present in only one of said frequency bins, said interference signal having a duration as small as a time duration of said one of said frequency bins, and wherein the output includes means for providing said control signal to notch said one of said frequency bins for said time duration of said one of said frequency bins.

4. A filter as claimed in claim 3 wherein said bin weight calculator has a sampler for sampling blocks of bins of said plurality of frequency bins provided by said FFT element, and wherein said predetermined amount of delay of said delay element is equal to a delay associated with sampling said blocks in said sampler, estimating said noise level in said noise estimator, comparing said individual bin level in said processor and providing said control signal by said output.

5. An adaptive frequency domain filter that responds to interference signals comprising:

a fast Fourier transform (FFT) element for transforming digitized baseband signals from a time domain to a frequency domain and providing a plurality of frequency bins, each frequency bin corresponding to a frequency range;

a delay element for delaying said frequency bins by a predetermined amount and providing delayed frequency bins;

a multiplier for notching said delayed frequency bins that contain said interference signals;

an inverse FFT element for transforming said delayed frequency bins provided by said multiplier from said frequency domain to said time domain; and a bin weight calculator for sampling said plurality of frequency bins provided by said FFT element and providing a control signal that directs said multiplier to notch one of said delayed frequency bins containing said interference signals, said control signal being time coincident with each of said delayed frequency bins provided by said delay element, said bin weight calculator including:

a noise estimator for estimating a noise level across frequency for each of a block of said frequency bins;

a bin averager for averaging bins across time for each of a plurality of frequency bins of a same frequency and providing average bin levels across time for each frequency bin of said plurality;

a processor for comparing said average bin levels across time with said noise level across frequency; and an output for providing said control signal to notch said one of said delayed frequency bins containing said interference signals when said average bin levels across time exceeds said noise level for a long duration signal predetermined threshold.

6. A filter as claimed in claim 5 wherein said bin averager averages bins of said same frequency across time for a time duration, and wherein said processor includes means for comparing said average bin levels across time with said noise level across frequency to detect interference signals having a duration at least as long said time duration.

7. A filter as claimed in claim 6 wherein said bin weight calculator has a sampler for sampling blocks of bins of said plurality of frequency bins provided by said FFT element, and wherein said predetermined amount of delay is equal to a delay associated with sampling said blocks in said sampler, estimating said noise level in said noise estimator, averaging said bins in said bin averager, comparing said bin level by said processor and providing said control signal by said output.

8. An adaptive frequency domain filter that responds to interference signals comprising:

a fast Fourier transform (FFT) element for transforming digitized baseband signals from a time domain to a frequency domain and providing a plurality of frequency bins, each frequency bin corresponding to a specific frequency;

a delay element for delaying said frequency bins by a predetermined amount and providing delayed frequency bins;

a multiplier for either passing or notching each of said delayed frequency bins;

an inverse FFT element for transforming said delayed frequency bins provided by said multiplier from said frequency domain to said time domain; and a bin weight calculator for providing a control signal that directs said multiplier to either notch or pass each of said frequency bins, said control signal being time coincident with each of said delayed frequency bins provided by said delay element, said bin weight calculator including a sampler for sampling blocks of bins of said plurality of frequency bins provided by said FFT element, and wherein said bin weight calculator provides said control signal to direct said multiplier to either notch or pass one of said frequency bins based on a detection of an interference signal of either a short duration or a long duration, wherein said short duration is as small as a time associated with said one of said frequency bins, and wherein said long duration is greater than a time associated with said blocks of bins sampled by said sampler.

9. An adaptive frequency domain filter that responds to interference signals comprising:

a fast Fourier transform (FFT) element for transforming digitized baseband signals from a time domain to a frequency domain and providing a plurality of frequency bins, each frequency bin corresponding to a specific frequency;

a delay element for delaying said frequency bins by a predetermined amount and providing delayed frequency bins;

a multiplier for notching said delayed frequency bins that contain said interference signals;

an inverse FFT element for transforming said delayed frequency bins provided by said multiplier from said frequency domain to said time domain; and a bin weight calculator for providing a control signal that directs said multiplier to notch said frequency bins that contain said interference signals, said control signal being time coincident with each of said delayed frequency bins provided by said delay element, wherein:

said FFT element includes a first buffer for providing an overlap between windowed blocks of time samples of said frequency bins wherein each subsequent windowed block of frequency bins is time-delayed from a previous block and has said overlap with said previous block, and a Fourier transform processor which performs a Fourier transform on each of said windowed blocks of time samples;

said bin weight calculator includes a sampler for sampling said windowed blocks provided by said FFT element; and said inverse FFT element includes an inverse Fourier transform processor for calculating an inverse Fourier transform on each of said windowed blocks of time samples, a second buffer for storing said windowed blocks of time samples that overlap, and a summer for adding said windowed blocks of time samples that overlap, wherein a scaled version of said digitized baseband signals results when said windowed blocks are repetitively added together delayed by multiples of said overlap.

10. A method for responding to a short duration interference signal comprising the steps of:

transforming digitized baseband signals from a time domain to a frequency domain and providing blocks of frequency bins, each frequency bin corresponding to a specific frequency range;

delaying said frequency bins by a predetermined amount and to provide delayed frequency bins;

transforming said delayed frequency bins from said frequency domain to said time domain;

estimating a noise level across frequency for each block of said frequency bins, each block of frequency bins being delayed in time from a previous block, and each block corresponding to a time sample;

comparing an individual bin level to said noise level for each block of frequency bins; and providing a control signal to notch one of said delayed frequency bins containing said short duration interference signal when said individual bin level exceeds said noise level by a predetermined threshold.

11. A method as claimed in claim 10 wherein the transforming digitized baseband signals step, the delaying step, the transforming said delayed frequency bins step, the estimating said noise level across frequency step, the comparing said individual bin level step, and the providing said control signal step are performed as part of an adaptive frequency domain filter.

12. A method for responding to interference signals comprising the steps of:

transforming digitized baseband signals from a time domain to a frequency domain and providing a plurality of frequency bins, each frequency bin corresponding to a specific frequency;

delaying said frequency bins by a predetermined amount and to provide delayed frequency bins;

transforming said delayed frequency bins from said frequency domain to said time domain;

estimating a noise level across frequency for each of a block of said frequency bins;

comparing an individual bin level to said noise level; and notching a frequency bin when said individual bin level exceeds said noise level by a short duration signal predetermined thresholds, wherein the comparing step compares said individual bin level to said noise level to detect an interference signal present in only one of said frequency bins, said interference signal having a duration as small as a time duration of said one of said frequency bins, and wherein the notching step includes the step of notching said one of said frequency bins for said time duration.

13. A method as claimed in claim 12 further comprising the step of sampling blocks of said frequency bins, and wherein said predetermined amount of delay is equal to a delay associated with the sampling step, the estimating step and the comparing step.

14. A method for canceling interference signals comprising the steps of:

transforming digitized baseband signals from a time domain to a frequency domain and providing a plurality of frequency bins, each frequency bin corresponding to a specific frequency range;

delaying said frequency bins by a predetermined amount and to provide delayed frequency bins;

transforming said delayed frequency bins from said frequency domain to said time domain;

estimating a noise level across frequency for each of a block of said frequency bins;

comparing an individual bin level to said noise level; and notching a frequency bin containing said interference signals when said individual bin level exceeds said noise level by a short duration signal predetermined threshold, wherein the transforming digitized baseband signals step provides blocks of said frequency bins, each block being time delayed from other blocks and having a frequency overlap, said method further comprising the steps of:

averaging bins across time for each of said plurality of frequency bins having a same frequency and providing average bin levels across time for each frequency bin said plurality;

comparing said average bin levels across time with said noise level across frequency; and providing a control signal to notch one of said frequency bins that contain said interference signals when said average bin levels across time exceeds said noise level for a long duration signal predetermined threshold.

15. A method as claimed in claim 14 the averaging step includes the step of averaging frequency bins having said same frequency across time for a time duration, and wherein the comparing step includes the step of comparing said average bin levels across time with said noise level across frequency to detect interference signals having a duration at least as long said time duration.

16. A method as claimed in claim 15 further comprising the step of sampling blocks of said frequency bins, and wherein the predetermined amount of delay of the delaying step is equal to a delay associated with the sampling step, the estimating step, the averaging step, the comparing step and the providing step.

17. A method for canceling interference signals comprising the steps of:

transforming digitized baseband signals from a time domain to a frequency domain and providing a plurality of frequency bins, each frequency bin corresponding to a specific frequency;

sampling blocks of said frequency bins;

delaying said frequency bins by a predetermined amount and to provide delayed frequency bins;

transforming said delayed frequency bins from said frequency domain to said time domain;

estimating a noise level across frequency for each of a block of said frequency bins;

comparing an individual bin level to said noise level;

notching a frequency bin when said individual bin level exceeds said noise level by a short duration signal predetermined threshold, wherein the notching step includes the step of providing a control signal to either notch or pass one of said frequency bins based on a detection of an interference signal of either a short duration or a long duration by the comparing step, and wherein said short duration is as small as a time associated with said one of said frequency bins, and wherein said long duration is greater than a time associated with said blocks of bins sampled in the sampling step.

18. A method for canceling interference signals comprising the steps of:

transforming digitized baseband signals from a time domain to a frequency domain and providing a plurality of frequency bins, each frequency bin corresponding to a specific frequency range;

delaying said frequency bins by a predetermined amount and to provide delayed frequency bins;

transforming said delayed frequency bins from said frequency domain to said time domain;

estimating a noise level across frequency for each of a block of said frequency bins;

comparing an individual bin level to said noise level; and notching a frequency bin containing said interference signals when said individual bin level exceeds said noise level by a short duration signal predetermined threshold, wherein:

the transforming digitized baseband signals step includes the step of providing an overlap between windowed blocks of time samples of said frequency bins wherein each subsequent windowed block of frequency bins is time-delayed from a previous block and has said overlap with said previous block, and wherein the method further comprises the step of performing a Fourier transform on each of said windowed blocks of time samples, and wherein the transforming said delayed frequency bins step includes the steps of performing an inverse Fourier transform on each of said windowed blocks of time samples; storing said windowed blocks of time samples that overlap; and adding said windowed blocks of time samples that overlap, and wherein a scaled version of said digitized baseband signals results when said windowed blocks are repetitively added together delayed by multiples of the overlap.

19. An adaptive frequency domain filter that responds to interference signals comprising:

a fast Fourier transform (FFT) element for transforming digitized baseband signals from a time domain to a frequency domain and providing a plurality of frequency bins, each frequency bin corresponding to a specific frequency;

a delay element for delaying said frequency bins by a predetermined amount and providing delayed frequency bins;

a multiplier for either passing or notching each of said delayed frequency bins;

an inverse FFT element for transforming said delayed frequency bins provided by said multiplier from said frequency domain to said time domain; and a bin weight calculator for providing a control signal that directs said multiplier to either notch or pass each of said frequency bins, said control signal being time coincident with each of said delayed frequency bins provided by said delay element, wherein said bin weight calculator includes:

a noise estimator for estimating a noise level across frequency for each of a block of said frequency bins;

a bin averager for averaging bins across time for each of a plurality of frequency bins of a same frequency and providing average bin levels across time for each frequency bin said plurality;

a processor for comparing an individual bin level to said noise level, and for comparing said average bin levels across time with said noise level across frequency; and an output for providing said control signal to notch one of said frequency bins either when said individual bin level exceeds said noise level by a short duration signal predetermined threshold, or when said average bin levels across time exceeds said noise level for a long duration signal predetermined threshold.

20. A filter as claimed in claim 19 wherein:

said FFT element includes means for providing blocks of said frequency bins that are delayed in time and overlap in frequency;

said bin averager averages bins of said same frequency across time for a time duration;

the processor includes means for comparing said individual bin level to said noise level to detect an interference signal present in only one of said frequency bins, said interference signal having a duration as small as a time duration of said one of said frequency bins, said processor including means for comparing said average bin levels across time with said noise level across frequency to detect interference signals having a duration at least as long said time duration.

\* \* \* \* \*